United States Patent [19]
James

[11] Patent Number: 6,133,938
[45] Date of Patent: Oct. 17, 2000

[54] DESCRIPTOR MECHANISM FOR ASSURING INDIVISIBLE EXECUTION OF AV/C OPERATIONS

[75] Inventor: David V. James, Palo Alto, Calif.

[73] Assignees: Sony Corporation of Japan, Tokyo, Japan; Sony Electronics, Inc., Park Ridge, N.J.

[21] Appl. No.: 09/267,143

[22] Filed: Mar. 11, 1999

Related U.S. Application Data

[60] Provisional application No. 60/078,014, Mar. 14, 1998.

[51] Int. Cl.[7] .............................. H04N 7/10; G06F 15/16
[52] U.S. Cl. ............................... 348/8; 709/210; 709/217
[58] Field of Search ................................. 348/8, 7, 9, 12, 348/13; 370/522; 709/208, 209, 210, 211, 218; 364/943.92, 944.6, 240.5; 455/6.3

[56] References Cited

U.S. PATENT DOCUMENTS

| | | | |
|---|---|---|---|
| 5,367,695 | 11/1994 | Narad et al. .............................. | 395/800 |
| 5,659,539 | 8/1997 | Porter et al. ....................... | 395/200.61 |
| 5,802,017 | 9/1998 | Sato et al. ..................................... | 369/2 |
| 5,878,216 | 3/1999 | Young et al. ....................... | 395/200.38 |
| 5,973,722 | 10/1999 | Wakai et al. .................................. | 348/8 |

*Primary Examiner*—Nathan Flynn
*Assistant Examiner*—Kieu-Oanh Bui
*Attorney, Agent, or Firm*—Wagner, Murabito & Hao LLP

[57] ABSTRACT

A system for implementing indivisible command execution in an AV/C home audio video network of connected network devices. A network bus operable for conveying commands among a plurality of coupled devices is coupled to each of the devices. A controller device is coupled to the network bus operable for generating a command sequence, the command sequence including a plurality of AV/C commands. A target device is coupled to the network bus, the target device operable for implementing AV/C operations by receiving and executing the command sequence. The target device is configured to identify the command sequence received from the controller via the network bus by reading a group tag field and a command status included in each AV/C command. The group tag field and the command status allow the target device to detect an interruption of the command sequence, such that the target device can avoid a partial execution of the command sequence by ensuring the entire command sequence either completes entirely or fails entirely.

20 Claims, 22 Drawing Sheets

| VALUE | NAME | DESCRIPTION |
|---|---|---|
| 0 | FREE | An isolated command, ignored by audit log |
| 1 | MORE | First of grouped commands, ignored by audit log |
| 2 | LAST0 | Last of grouped commands, captured in audit log |
| 3 | LAST1 | |

COMMAND GROUP TAG (gtag) VALUES

FIGURE 5

FIGURE 6 — COMMAND COMPLETION RECORD

| VALUE (base 16) | NAME | support (by ctype) | | | subclause | Description |
|---|---|---|---|---|---|---|
| | | C | S | N | | |
| TBD | CREATE_OBJECT | | | | 7.2 | Create object reference & instance |
| " | DELETE_OBJECT | | | | 7.3 | Delete object reference & instance |
| " | READ_DESCRIPTOR | | | | 7.4 | Read descriptive data |
| " | INSERT_DESCRIPTOR | | | | 7.5 | Insert descriptive data |
| " | DELETE_DESCRIPTOR | | | | 7.6 | Delete descriptive data |

HDD REALTED UNIT AND SUBUNIT COMMANDS

FIGURE 7

| cts | ctype | subunit_type | subid | opcode | | plugid |
|---|---|---|---|---|---|---|
| | cmdStatus | gtag | | reserved | | |
| | | | | objectidHi | | |
| | | | | objectidLo | | |
| | | | | quadletOffset | | |

CREATE_OBJECT COMMAND FORMAT

FIGURE 8

| RESPONSE FRAME | VALUE (base 16) | Name | DESCRIPTION |
|---|---|---|---|
| COMMAND FRAME | | | |
| — | 0F | — | Not Used |
| | 1F | (none) | Basic Command |
| | 2F-FF | — | Reserved for future extensions |
| RESPONSE FRAME | | | |
| ACCEPTED | 00 | NORMAL | Completed normally |
| | 01-0F | — | Reserved for future expansions |
| REJECTED | 00 | ABORTED | Conflict detected; sequence aborted |
| | 01 | PROTECTED | The reference-creation address is protected |
| | 02-0F | — | Reserved for future expansion |

CREATE_OBJECT *cmdStatus* VALUES

FIGURE 9

| cts | ctype | subunit_type | subid | opcode | plugid |
|---|---|---|---|---|---|
| *cmdStatus* | | gtag | | reserved | |
| | | | objectidHi | | |
| | | | objectidLo | | |
| | | | elementSelect | | |

DELETE_OBJECT COMMAND FORMAT

FIGURE 10

| RESPONSE FRAME | VALUE (base 16) | Name | DESCRIPTION |
|---|---|---|---|
| | COMMAND FRAME | | |
| — | 0F | — | Not Used |
| | 1F | (none) | Basic Command |
| | 2F-FF | — | Reserved for future extensions |
| | RESPONSE FRAME | | |
| ACCEPTED | 00 | NORMAL | Completed normally |
| | 01 | — | Object could not be found |
| | 02-0F | — | Reserved for future expansions |
| REJECTED | 00 | ABORTED | Conflict detected; sequence aborted |
| | 01 | PROTECTED | The insertion address is a protected address |
| | 01-0F | — | Reserved for future extensions |

DELETE_OBJECT *cmdStatus* VALUES

FIGURE 11

READ_DESCRIPTOR FORMATS

| RESPONSE FRAME | VALUE (base 16) | Name | DESCRIPTION |
|---|---|---|---|
| | | COMMAND FRAME | |
| — | 0F | — | Not Used |
| | 1F | (none) | Basic Command |
| | 2F-FF | — | Reserved for future extensions |
| | | RESPONSE FRAME | |
| ACCEPTED | 00 | NORMAL | Read returns the requested number of bytes |
| | 01 | PARTIAL | The transport limited the transfer size |
| | 02 | ENDING | The descriptor size limited the transfer size |
| REJECTED | 00 | ABORTED | Conflict detected; sequence aborted |
| | 01 | PROTECTED | Address range includes a protected address |
| | 02-0F | — | Reserved for future extensions |

READ_DESCRIPTOR *cmdStatus* VALUES

FIGURE 13

INSERT_DESCRIPTOR COMMAND FORMATS

| RESPONSE FRAME | VALUE (base 16) | Name | DESCRIPTION |
|---|---|---|---|
| COMMAND FRAME ||||
| — | 0F | — | Not Used |
| — | 1F | (normal) | Basic INSERT_DESCRIPTOR Command |
| — | 2F-FF | — | Reserved for future extensions |
| RESPONSE FRAME ||||
| ACCEPTED | 00 | NORMAL | The specified write was performed correctly |
| ACCEPTED | 01 | PARTIAL | The initial portion of the write was performed correctly |
| REJECTED | 00 | ABORTED | Conflict detected; sequence aborted |
| REJECTED | 01 | PROTECTED | The insertion address is a protected address |
| | 02-0F | — | Reserved for future expansion |
| REJECTED | 00 | ABORTED | Conflict detected; sequence aborted |
| REJECTED | 01 | PROTECTED | The insertion address is a protected address |
| REJECTED | 02 | ILLEGAL | The insertion address is an illegal address |
| | 03-0F | — | Reserved |

INSERT_DESCRIPTOR *status* VALUES

FIGURE 15

| cts | ctype | subunit_type | subid | opcode | plugid |
|---|---|---|---|---|---|
| | *cmdStatus* | gtag | | reserved | |
| | | | | | |
| | | | objectidHi | | |
| | | | objectidLo | | |
| | | | entryAddress | | |
| | | | dataAddress | | |
| | | | dataLength | | |

DELETE_DESCRIPTOR COMMAND FORMATS

FIGURE 16

| RESPONSE FRAME | VALUE (base 16) | Name | DESCRIPTION |
|---|---|---|---|
| | | | COMMAND FRAME |
| — | 0F | — | Reserved for future extensions |
| | 1F | (basic) | Basic DELETE_DESCRIPTOR command |
| | 2F-FF | — | Reserved for future extensions |
| | | | RESPONSE FRAME |
| ACCEPTED | 00 | NORMAL | The specified deletion was performed correctly |
| | 01-0F | — | Reserved |
| REJECTED | 00 | ABORTED | Conflict detected; sequence aborted |
| | 01 | ILLEGAL | The deletion address is an illegal address |
| | 02-0F | PROTECTED | The deletion address is a protected address |
| | 02-0F | — | Reserved |

DELETE_DESCRIPTOR *status* VALUES

FIGURE 17

SEARCH_DESCRIPTOR COMMAND FORMATS

| cts | ctype | subunit_type | subid | opcode | plugid |
|---|---|---|---|---|---|
| *cmdStatus* | | gtag | | reserved | |
| | | | objectidHi | | |
| | | | objectidLo | | |
| | | | firstidAddress | | |

SEARCH_DESRIPTOR RESPONSE FRAME

FIGURE 19

| RESPONSE FRAME | VALUE (base 16) | Name | DESCRIPTION |
|---|---|---|---|
| | | COMMAND FRAME | |
| — | 0F | — | Not Used |
| | 1F | (basic) | Basic command functionality |
| | 2F-FF | — | Reserved for future extensions |
| | | RESPONSE FRAME | |
| ACCEPTED | 00 | NORMAL | The specified data was found |
| | 01 | NOT_FOUND | The specified data was not found |
| | 02-07 | — | Reserved |
| REJECTED | 00 | ABORTED | Conflict detected; sequence aborted |
| | 01 | TOO_LONG | The *searchFor* size exceeds subunit capability |
| | 02-0F | — | Reserved |

SEARCH DESCRIPTOR *status* VALUES

FIGURE 20

DESCRIPTOR MECHANISM FOR ASSURING INDIVISIBLE EXECUTION OF AV/C OPERATIONS

This application claims the benefit of the earlier filed provisional application, David V. James, "A Descriptor Mechanism within Models and Command Sets for an AV/C Protocol", U.S. Ser. No. 60/078,014 filed on Mar. 14, 1998, which is incorporated herein by reference.

FIELD OF THE INVENTION

The field of the present invention pertains to audio-video consumer electronics systems. More particularly, the present invention pertains to interfacing audio-visual media devices via a network bus to interface shared resources using industry standard AV/C protocols.

BACKGROUND OF THE INVENTION

A typical home audio-visual equipment setup includes a number of components. For example, a radio receiver, a CD player, a pair of speakers, a television, a VCR, a tape deck, and alike. Each of these components is connected to each other via a set of wires. One component is usually the central component of the home audiovisual system. This is usually the radio receiver, or the tuner. The tuner has a number of specific inputs for coupling the other components. The tuner has a corresponding number of control buttons or control switches which provide a limited degree of controllability and inter-operability for the components. A user controls the home audiovisual system by manipulating the buttons and switches on the front of the tuner or, alternatively, manipulating buttons on the hand-held remote control unit. These actions in turn control the operation of the various external devices coupled to the tuner.

This conventional home audiovisual system paradigm has become quite popular. As the number of new consumer electronics devices for the home audiovisual system has grown and as the sophistication and capabilities of these devices have increased, a number of problems with the conventional paradigm have emerged. One such problem is incompatibility between devices in the home audiovisual system. Consumer electronic devices from one manufacturer often couple to an audiovisual system in a different manner than similar devices from another manufacturer.

To solve these problems, interoperability protocols have been developed to define standards for interfacing devices over a serial network bus. One such standard is the AV/C standard. The AV/C protocol defines the hardware interfaces, software based structures, and software based functions required to ensure interoperability between networked consumer electronic devices. AV/C specifies the manner in which devices present their respective functionality to other devices on the network by defining how functionality and content is represented, how content is modified and updated, how devices interact to access each other's functionality and content, etc. Thus, AV/C protocols resolve many of the interoperability problems and control problems of home audio video systems.

However, there is a problem with interoperability between multiple devices on the network bus and the access of one or more shared resources on the network bus. While the AV/C protocol defines satisfactory methods for inter-access between devices on the network bus, there is no satisfactory solution for handling multiple requests from devices to access a shared resource. For example, in a case where one such shared resource is an audio video hard disk drive storing various video segments, one device can be writing a contents directory to the hard disk while another device is attempting to read another content directory from the hard disk for display on a monitor. If the two operations occur before one or the other is complete, in other words, if the two operations overlap, the network may fail or "crash", data on the hard disk can be corrupted, the hard disk can be left in some unusable state, or the like.

One prior art solution to the problem of concurrent access to a shared resource involves the use of resource locking mechanisms. For example, when a shared resource is accessed by a first device, the resource is locked such that it cannot be accessed by a second device. Once the access of the first device is complete, the resource is unlocked. The second device subsequently reattempts its access with the unlocked resource. This solution has undesirable consequences. The locking of shared resources leads to the problem of properly managing the locking mechanism. If a lock is inadvertently left in place, or if a lock is removed prematurely, the network may crash, data on the shared resource can be corrupted, the shared resource can be left in some unusable state, or the like.

While the emergence of networking and interface technology (e.g., IEEE 1394 serial communication bus and the wide spread adoption of digital systems) offers prospects for correcting the shared resource accessibility problem, there is still no coherent, extensible architecture for the efficient management of access to shared resources within the AV/C protocol frame work. There is no AV/C based system for ensuring reliable access to shared resources. As IEEE 1394 and other types of serial bus technology spreads across product lines, it is necessary to define logical models and command sets for accessing and updating content stored on shared network devices.

SUMMARY OF THE INVENTION

The present invention provides a method and system that leverages the widespread emergence of networking and interface technology (e.g., IEEE 1394 serial communication bus and the wide spread adoption of digital systems) to provide for reliable, efficient access to shared resources within an AV/C based home audio video network. The present invention provides a coherent, extensible architecture for the efficient management of access to shared resources by providing extensions to the AV/C protocol frame work. The extensions of the present invention create an AV/C based system that ensures reliable access to shared resources by multiple devices coupled within the network. Further, the system of the present invention defines logical models and command sets for accessing and updating content stored on shared network devices in a manner consistent with the open standards of IEEE 1394 and other types of serial bus technology.

In one embodiment, the present invention is implemented as a descriptor mechanism that extends the models and command sets of an AV/C protocol network to provide assured access to shared resources. Functions are implemented through the execution of sequences of AV/C commands. To access an AV/C device, a external controller device sends a sequence of commands AV/C "target" device for processing, thereby fulfilling the access. That sequence is distinctively identified, by labeling the first, middle, and final AV/C commands in the sequence. When this sequence has been processed, all AV/C commands appear to complete successfully (typically the case), or none complete at all (sometimes the case). The all-or-nothing processing strategy advantageously ensures data stored on the AV/C target device (e.g., an audio video hard disk drive) is never left in an inconsistent or corrupted state.

Additionally, the descriptor mechanism of the present invention provides for indivisibility of execution, meaning that if the data is modified by another controller device, after having been read in this sequence, the sequence will fail. This is because the other sequential commands are based on the assumption that the initial data reads have not changed.

Indivisibility of execution is implemented by including a distinct label in the AV/C commands to identify their grouped nature and position. Also, status code values are included to indicate when the sequence has failed (e.g., ABORTED), typically due to a concurrent modification of the affected data structures within the AV/C target device. In this manner, the descriptor mechanism implements "transactions" on the shared AV/C target device to implement reliable access and updates by multiple AV/C controller devices.

BRIEF DESCRIPTION OF THE DRAWINGS

The present invention is illustrated by way of example and not by way of limitation, in the figures of the accompanying drawings and in which like reference numerals refer to similar elements and in which:

FIG. 5 shows a table of the different values of a group tag field for a command.

FIG. 7 shows hard disk drive related subunit and unit commands in accordance with one embodiment of the present invention.

FIG. 8 shows the format of a CREATE_OBJECT command in accordance with one embodiment of present invention.

FIG. 9 shows a table of the CREATE_OBJECT command status values in accordance with one embodiment of the present invention.

FIG. 10 shows the format of a DELETE_OBJECT command in accordance with one embodiment of present invention.

FIG. 11 shows a table of the DELETE_OBJECT cmd-Status values in accordance with one embodiment the present invention.

FIG. 13 shows a table of the READ_DESCRIPTOR command status values in accordance with one embodiment the present invention.

FIG. 15 shows a table of the INSERT_DESCRIPTOR status values in accordance with one embodiment of present invention.

FIG. 16 shows the format of a DELETE_DESCRIPTOR command in accordance with one embodiment of the present invention.

FIG. 17 shows a table of the DELETE_DESCRIPTOR status values in accordance with one embodiment of the present invention.

FIG. 19 shows a table of the SEARCH_DESCRIPTOR to response frame values in accordance with one embodiment of the present invention.

FIG. 20 shows a table of the SEARCH_DESCRIPTOR status values in accordance with one embodiment of the present invention.

DETAILED DESCRIPTION OF THE INVENTION

Figure 1A:
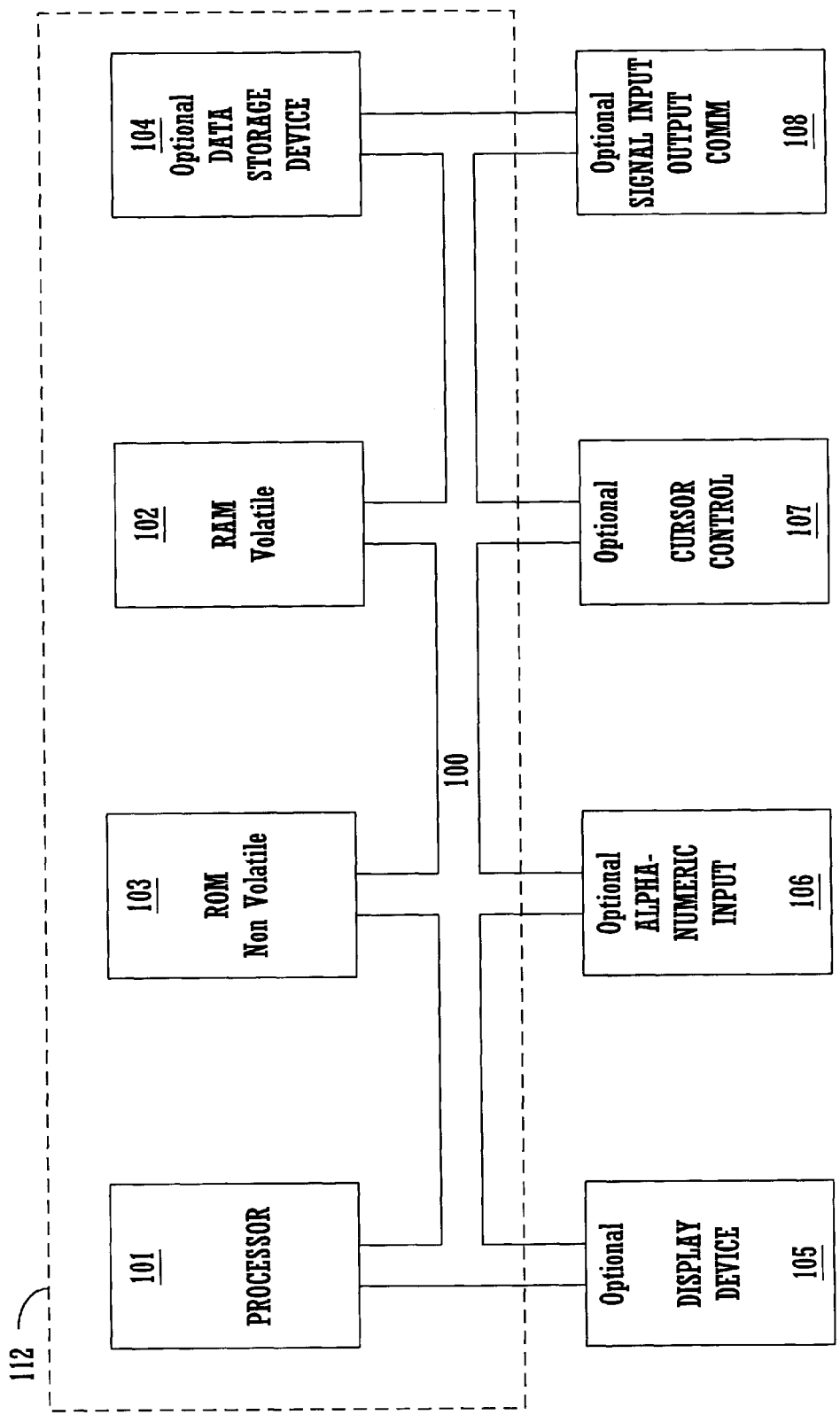
FIG. 1A shows a computer system environment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

Computer System Environment

Referring to FIG. 1A, a computer system 112 is illustrated. Within the following discussions of the present invention, certain processes and steps are discussed that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail as follows.

In general, computer system 112 used by the present invention comprises an address/data bus 100 for communicating information, one or more central processors 101 coupled with bus 100 for processing information and instructions, a computer readable volatile memory unit 102 (e.g., random access memory, static RAM, dynamic RAM, etc.) coupled with bus 100 for storing information and instructions for central processor(s) 101, a computer readable non-volatile memory unit (e.g., read only memory, programmable ROM, flash memory, EPROM, EEPROM, etc.) coupled with bus 100 for storing static information and instructions for central processor(s) 101. System 112 can optionally include a mass storage computer readable data storage device 104, such as a magnetic or optical disk and disk drive coupled with bus 100, for storing information and instructions. Optionally, system 112 can also include a display device 105 coupled to bus 100 for displaying information to the computer user, an alphanumeric input device 106 including alphanumeric and function keys coupled to bus 100 for communicating information and command selections to central processor(s) 101, a cursor control device 107 coupled to the bus for communicating user input information and command selections to central processor(s) 101, and a signal input/output device 108 coupled to bus 100 for communicating messages, command selections, data, etc. to and from central processor(s) 101.

Figure 1B:
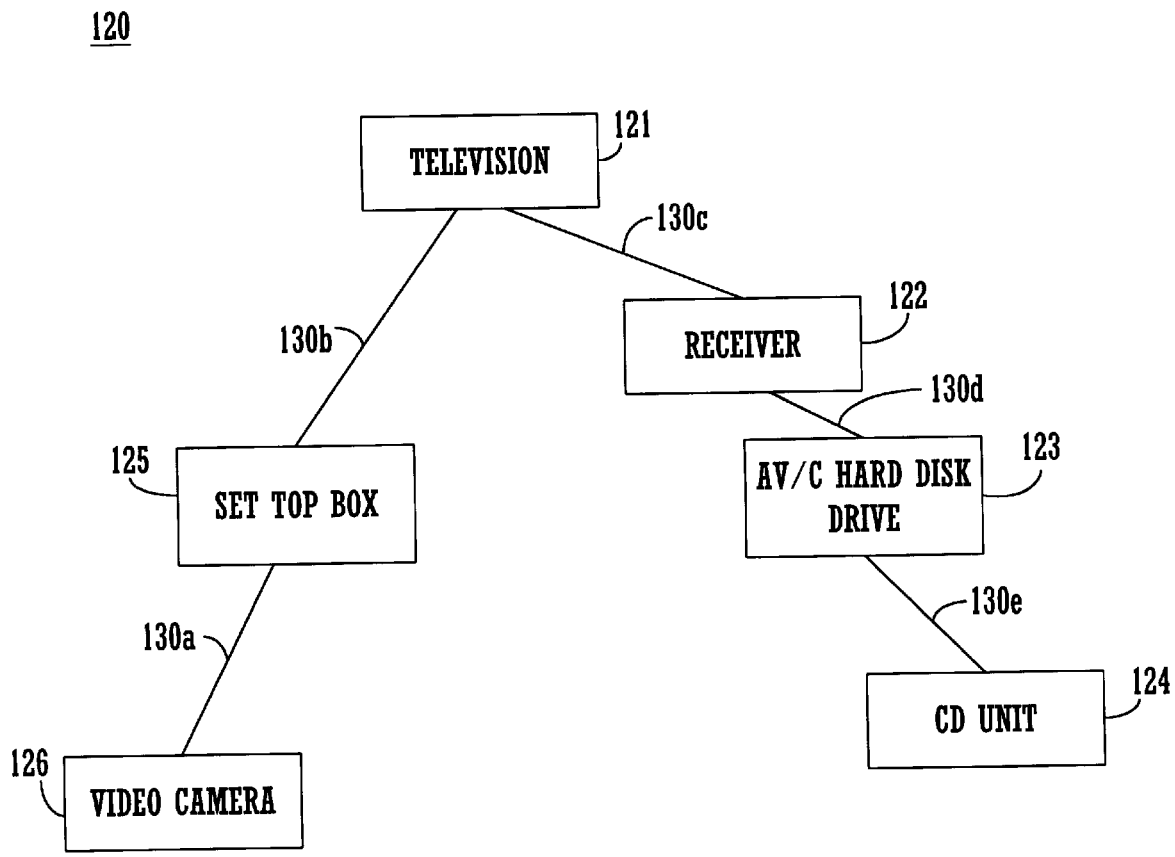
FIG. 1B shows an AV/C network in accordance with one embodiment of present invention.

With reference now to FIG. 1B, an AV/C network 120 in accordance with one embodiment of the present invention is shown. Network 120 includes 6 devices: a television 121, a receiver 122, a multi-disc DVD player 123, a CD unit 124, a set top box 125, and a video camera 126. Each of the devices 121–126 is communicatively coupled via respective IEEE 1394 bus links 130a through 130e to form a single network, wherein each device on the network can communicate with any other device on the network (e.g., in accordance with well known IEEE 1394 bus protocols). While network 120 is shown including 6 devices, it is understood that network 120 is suited to include any number of devices, up to the limits of the particular bus technology.

The IEEE 1394 serial bus used by network 120 of FIG. 1B is a high-speed bus architecture for interconnecting digital devices thereby providing a universal input/output connection. The IEEE 1394 standard defines a digital interface for the applications thereby eliminating the need for an application to covert digital data to analog data before it is transmitted across the bus. Correspondingly, a receiving application receives digital data from the bus, not analog data, and therefore is not required to covert analog data to digital data. The cable required by the IEEE 1394 standard is very thin in size compared to other bulkier cables used to connect such devices. Devices can be added and removed from an IEEE 1394 bus while the bus is active. If a device is so added or removed, the bus automatically reconfigures itself for transmitting data between the then existing nodes. A node is considered a logical entity having a unique address on the bus structure. Each node provides an identification ROM, a standardized set of control registers and its own address space.

The IEEE 1394 communication standard of network 120 of FIG. 1B supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of an application for the transfer of data isochronously is from a set top box 125 to a television 121. The set top box 125 receives the video stream from a cable company and divides the stream into discrete packets. The set top box 125 then transfers each packet, representing the images and sounds recorded over a limited time period, during that time period, for display by the television 121. The IEEE 1394 standard bus architecture provides multiple channels for isochronous data transfers between applications. Specifically, a six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

It should be appreciated that the present invention is equally well suited for home audio visual networks based upon other well known network or bus standards besides IEEE 1394. Such standards include, for example, ethernet, universal serial bus, token ring, and the like. Accordingly, the IEEE 1394 structure of network 120 is shown and described herein as an example bus architecture only.

AV/C Generally

Generally, AV/C is a protocol that defines the software based data structures and functions which abstract the physical, hardware based functionality of devices on a network (e.g., network 120) and provides a standardized method and system for interaction among the devices and for controlling, using, invoking, etc., the functionality of the devices. Particularly, the present invention provides a software based interface technology that ensures reliable, efficient access to shared resources within the AV/C based home audio video network. Descriptor mechanism extensions are provided that ensure reliable access to shared resources by multiple devices. The system of the present invention defines logical models and command sets for accessing and updating content stored on shared network devices in a manner consistent with the open standards of IEEE 1394 (e.g., network 120) and other types of serial bus technology.

The various devices on an AV/C network are modeled as software based objects, or models, defined by a technical specification in which the specific implementation is left to the product manufacturer. The AV/C protocols defines several data structures for representing different types of device functionality (e.g., how to describe a compact disc, a DVD disc, etc.), the contents of the media (titles for each track on a disc, the duration of each track, etc.), and for status reporting and notification. These data structures could be modified in any number of ways to include or exclude various pieces of information which may or may not be available depending on the specific media and/or capabilities built into a specific device.

It should be appreciated that the features and data structures used for the AV/C device models, the general descriptor structures and commands, and the like are described in the AV/C 3.0 specification. An understanding of the general AV/C enhancements described above is helpful in understanding the present invention, and as such, the AV/C 3.0 specification is incorporated herein by reference as background material. Therefore, that information is not generally repeated here. As such, only the descriptor-specific mechanisms, structures, commands and implementation profiles are primarily described.

In addition, for more detailed information regarding objects and object lists, readers are referred to US Patent Application "METHOD AND APPARATUS FOR REPRESENTING DEVICES AND AVAILABLE INFORMATION WITHIN A NETWORK OF DEVICES USING OBJECT LISTS AND OBJECT ENTRIES" filed on Mar. 17, 1998, which is incorporated herein by reference.

The Descriptor Mechanism

Figure 2:
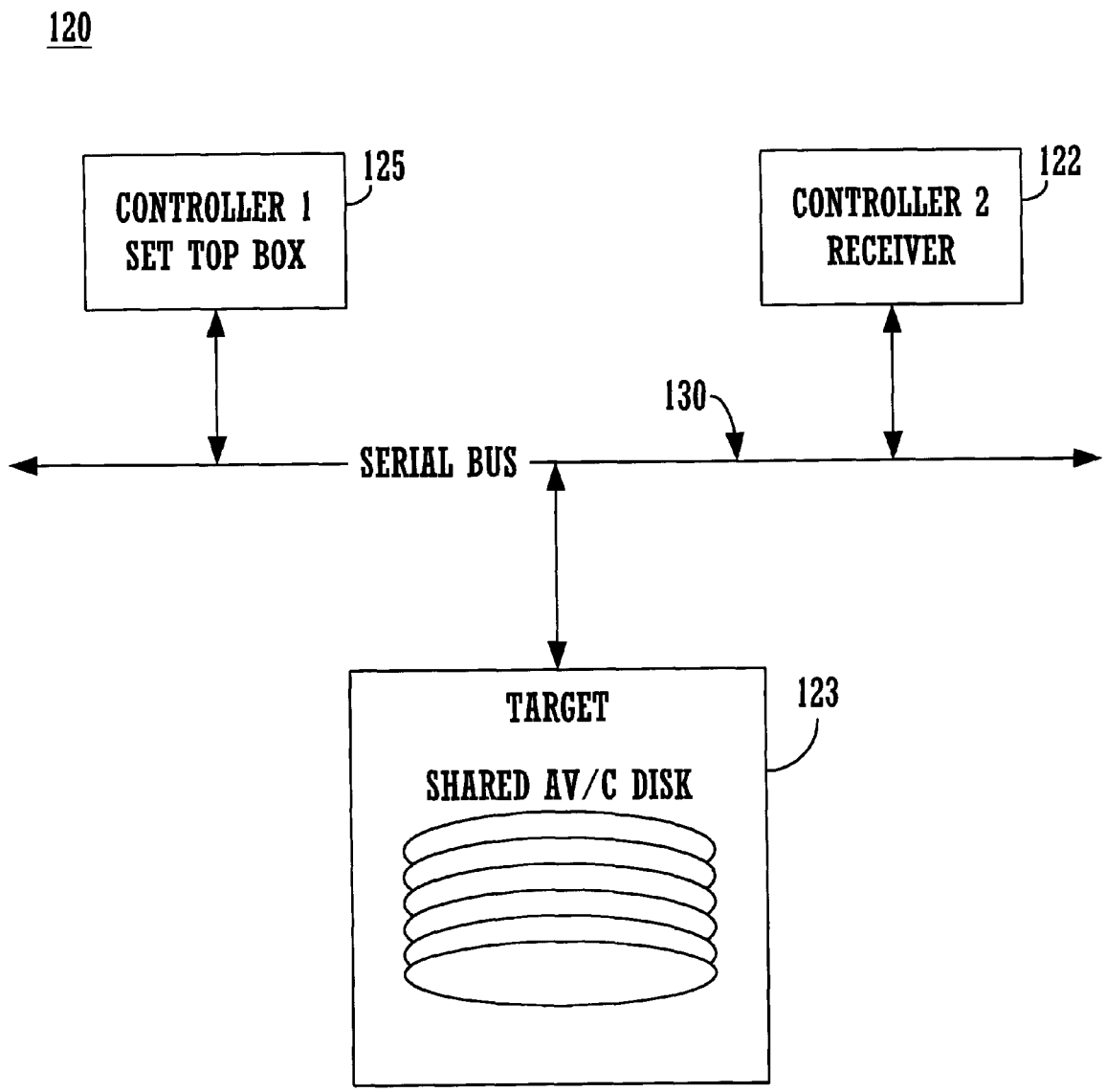
FIG. 2 shows a diagram of a descriptor mechanism in accordance with one embodiment to the present invention.

With reference now to FIG. 2, a diagram of the descriptor mechanism of the present invention is shown. FIG. 2 shows a first controller, the set-top box 125, and a second controller, the receiver 122, coupled to a target, a shared AV/C hard disk drive 123. Devices 122, 125, and 123 are coupled via bus 130.

In the present embodiment, a descriptor mechanism is shown being implemented between the first and second controllers 122 and 125, and the disc drive 123. The descriptor mechanism, as described above, extends the models and command sets of an AV/C protocol network to provide assured access to shared resources, in this case, the hard disk 123. Functions are implemented through the execution of sequences of AV/C commands from the first controller 125 or the second controller 122. For example, to access disk drive 123, controller 125 sends a sequence of AV/C commands to the target device for processing. For example, These AV/C commands could instructed disk drive 123 to retrieve certain data (e.g., a particular video track) in transmit that data to one or more of the devices on network 120. Thus, to perform a particular operation on disk drive 123, a series of AV/C commands are executed, wherein the execution of the sequence of commands comprise the actual operation. Operations cannot be successfully completed if the individual commands comprising the operation are interrupted at some point before each of the commands in the command sequence has been executed. In other words, the command sequences must be indivisible.

Indivisibility of execution is implemented by including a distinct label in the AV/C commands to identify their grouped nature and position. Command sequences are distinctively identified by labeling the first, middle, and final AV/C commands in the sequence. Also, status code values are included to indicate when the sequence has failed (e.g., ABORTED), typically due to a concurrent modification of the affected data structures within the AV/C target device. In accordance with present invention, when this sequence has been processed, all AV/C commands appear to complete successfully (typically the case), or none complete at all (sometimes the case). The all-or-nothing processing strategy advantageously ensures data stored on the AV/C target device (e.g., an audio video hard disk drive) is never left in an inconsistent or corrupted state. This allows the descriptor mechanism of the present invention to provide for indivisibility of execution, meaning that if the data is modified by another controller device, after having been read in this sequence, the sequence will fail. This is because the other sequential commands are based on the assumption that the initial data reads have not changed. In this manner, the descriptor mechanism implements "transactions" on the shared AV/C target device (e.g., hard disk 123 of FIG. 2) to implement reliable access and updates by multiple AV/C controller devices (e.g., set-top box 125 and receiver 122).

The present invention uses the command sequence position and status values to provide the necessary structure and architecture to implement transaction processing with regard to the updating object or file descriptors. An example implementation of such transaction processing techniques is diagram in FIG. 3 below.

Figure 3:
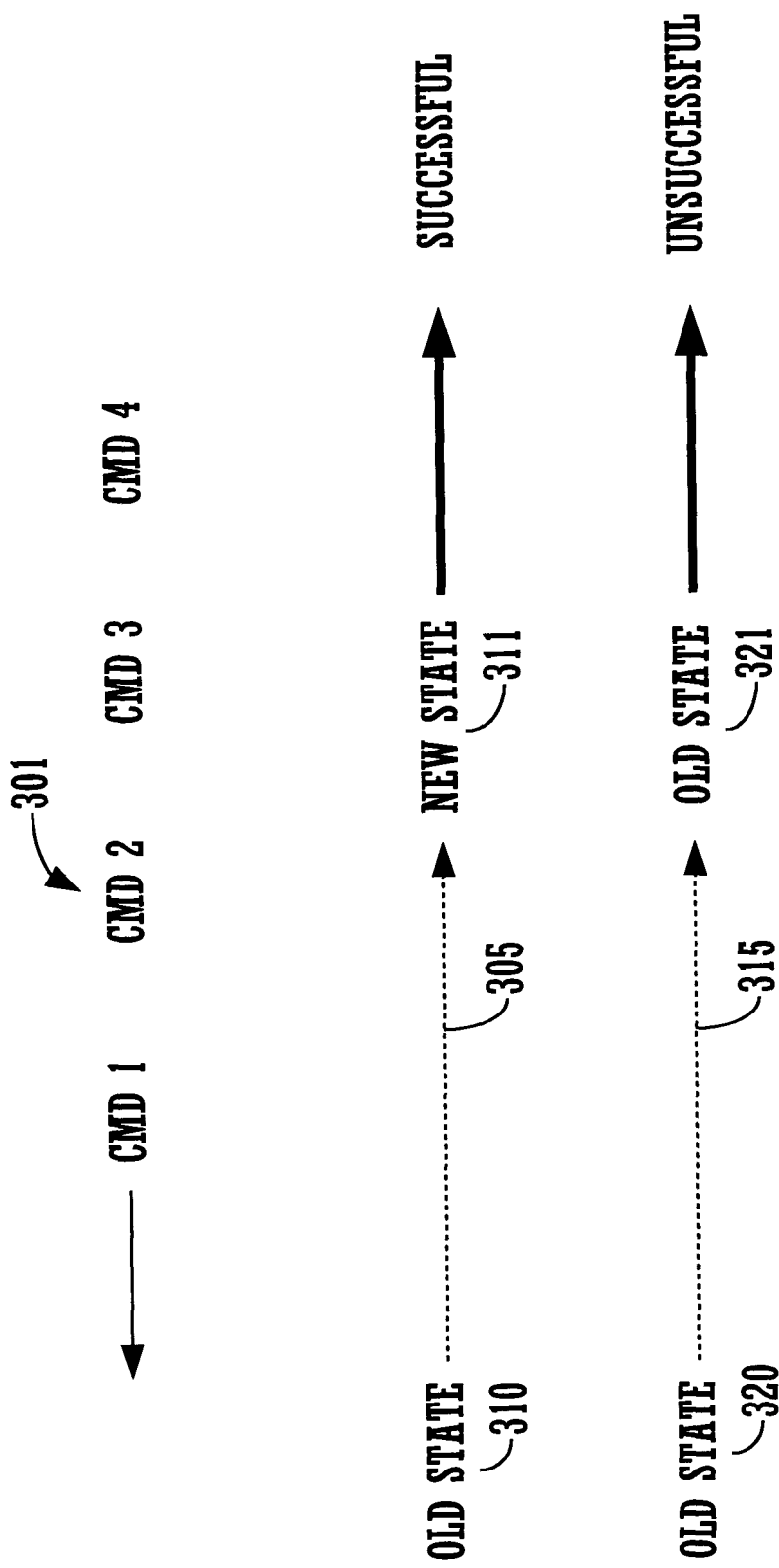
FIG. 3 shows a diagram of a typical AV/C operation in accordance with one embodiment of the present invention.

Referring now to FIG. 3, a diagram 300 of a typical AV/C operation in accordance with present invention is shown. As depicted in diagram 300, a command sequence 301 comprising a series of individual commands (command 1, command 2, command 3, command 4, etc.) is shown. As depicted, command sequence 301 is executed from left to right. This is shown by the arrow to the left of command 1. In this example, command sequence 301 involves the writing of data to hard disk 123 of FIG. 2.

As described above, in accordance with the descriptor mechanism of the present invention, command sequence 301 is processed such that either all AV/C commands (command 1, command 2, command 3, command 4, etc.) appear to complete successfully (typically the case), or none of the AV/C commands complete at all (sometimes the case). This is shown in FIG. 3 by an old state 310, the processing of command sequence 301 as represented by line 305, and a new state 311. Where each of the commands comprising command sequence 301 execute successfully, the operation is deemed successful and the hard disk 123 adopts new state 311 as its resulting condition (e.g., the files having successfully been written to the tracks of hard disk 123). In contrast, old state 320, processing line 315, and old state 321 show the results of an unsuccessful operation. Where one or more of the commands comprising command sequence 301 did not execute successfully, the entire operation is deemed unsuccessful, and hard disk 123 adopts old state 321 as its resulting condition (e.g., any commands of command sequence 301 having executed successfully are "rolled back" such that old state 321 is identical to old state 320).

Thus, hard disk 123 maintains an old state, processes commands to generate a new state, wherein if the commands complete past a "commit point", the new state is adopted and the old state is discarded. If the commands do not complete past the commit point, the old state is adopted, and any incremental changes toward the new state are discarded. In this manner, the present invention implements a form of transaction processing to ensure indivisible execution. The descriptor mechanism of the present invention uses transaction processing techniques in order to ensure access reliability to shared devices. If all commands in a group or sequence complete successfully, the new resulting state is adopted. If all commands in a group do not complete successfully, the old state is restored and the partially completed new state is discarded. There exist many techniques available for implementing transaction processing. Any of these techniques can be used to implement the functionality. The descriptors provide the necessary information to implement transaction processing.

Hence, externally, the object descriptor for hard disk 123 has only two observable states: the old state and the new state. No other state is permitted to be exposed to external devices on network bus 130. This allows shared resources such as hard disk 123 to be simultaneously accessed. If the simultaneous accesses do not conflict, they both proceed. If the simultaneous accesses conflict, one proceeds and one is failed. The failed access is completely rolled back such that hard disk 123 is never left in an unusable state. The failed access reverts back to the old state prior to the beginning of the operation. Following the completion of the successful access, the failed access can be re-executed. In addition, in contrast to the prior art, no resource locking is required and no resource blocking is required.

Specific Command Implementations

As described above, the descriptor mechanism extensions of the present invention are operable to ensure reliable access to shared resources by multiple devices. The system of the present invention defines logical models and command sets for accessing and updating content stored on shared network devices in a manner consistent with the open standards of IEEE 1394 (e.g., network 120) and other types of serial bus technology. Example commands representative of these command sets are discussed below.

Figure 4:
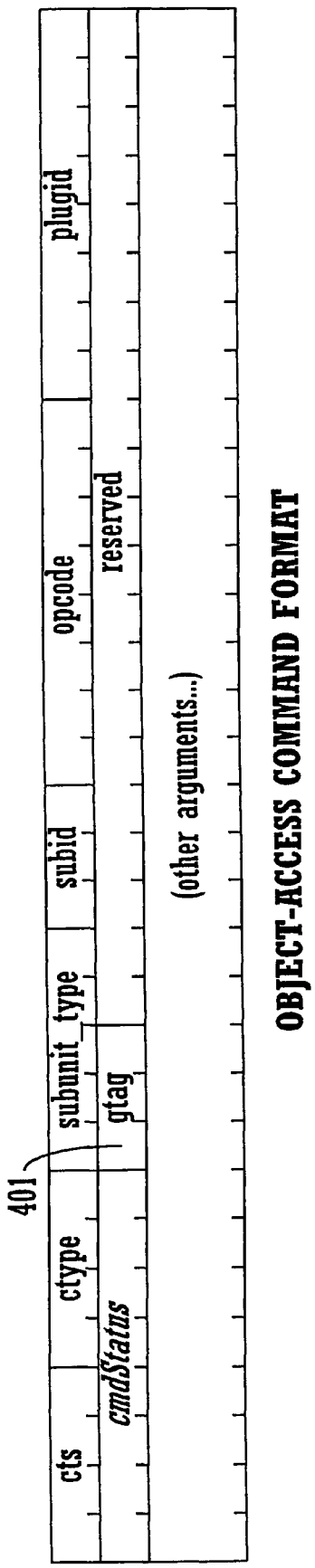
FIG. 4 shows an exemplary object access command format in accordance with one embodiment of present invention.

Referring now to FIG. 4, an exemplary object access command format in accordance with one embodiment of the present invention is shown. Object descriptor access commands each contain parameters that specify the grouping of these commands within a specific command sequence. This is shown by the group tag field, shown in FIG. 4 as "gtag" 401. The plugid value allows the object-update commands to be affiliated with a (normally) connected plug, so that commands can be grouped and executed indivisibly. The cmdStatus (command and status) value serves two purposes. In a command frame, cmdStatus (sometimes) selects which sub-operation is performed. In the response frame, cmdStatus returns completion-status information. The 2-bit gtag (group tag) field specifies the relationship of this command and others from the same session, as shown in FIG. 5.

Referring now to FIG. 5, a table of the different values of the gtag field is shown. The gtag value distinctively labels the outstanding commands, so that the controller can correctly determine which commands have completed, by checking the connection's semi-persistent command completion object.

Note that the last committed transaction is identified by a semi-persistent completion object. A CONNECT command argument specifies the desired lifetime of this semi-persistent object, but that value cannot exceed $2^{16}$ seconds. The device has the option of deleting these semi-persistent objects after their nominal lifetime expires, but has no specific deletion-completion time requirements.

Figure 6:
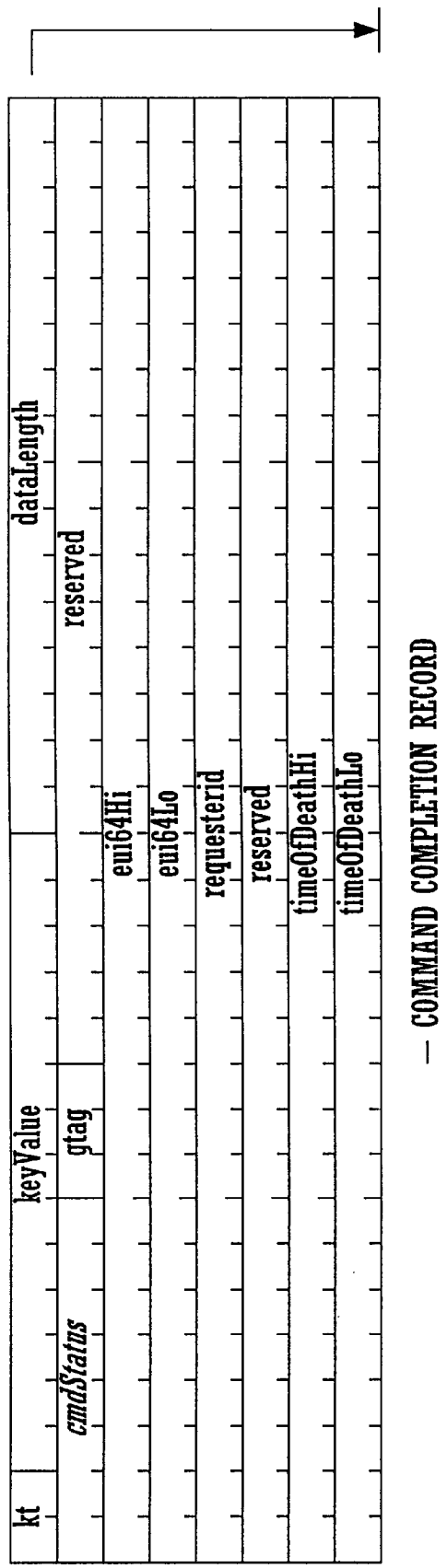
FIG. 6 shows a command completion record in accordance with one embodiment of the present invention.

FIG. 6 shows a command completion record in accordance with one embodiment of the present invention. A command completion record is a particular type of object that is created when the last command in an AV/C command group is executed. The completion record contains the eui64 identifier of the connected owner, and the first quadlet of the most recent final command group entry, as illustrated in FIG. 6.

FIG. 7 shows hard disk drive related subunit and unit commands in accordance with one embodiment of present invention. There are several new commands that are related to object descriptor updates. FIG. 7 specifies the new command assignments and the suggested support levels for the subunits which support the object lists mechanism. It should be noted that not all subunit types may have the same support levels.

FIG. 8 shows a CREATE_OBJECT command in accordance with one embodiment of the present invention. The CREATE_OBJECT command creates an object, inserting object reference at the specified location. The format the is shown in FIG. 7. As described above, the 8-bit cmdStatus (command and status) value serves two purposes: In a command frame, cmdStatus (sometimes) selects which sub-operation is performed. In the response frame, cmdStatus returns completion-status information. The 2-bit gtag field is used for command-grouping purposes. The 32-bit objectIdHi and objectIdLo fields are concatenated to produce a 64-bit objectId value. The objectId identifies the referencing object (called listobject), where a reference to the created object (called newObject) is to placed. The elementSelect value specifies the location in the listObject's list, as an array index value, where the newly created newObject identifier is placed.

FIG. 9 shows a table of the CREATE_OBJECT cmdStatus values in accordance with one embodiment of the present invention. The status field in the command frame communicates command mode options to the target. In the response frame, the returns status information from the target, as specified in FIG. 9.

FIG. 10 shows the format of a DELETE_OBJECT command in accordance with one embodiment of present invention. The DELETE_OBJECT command deletes an object reference and the referenced object, but doesn't delete other references to the deleted object. The command specifies which reference is to be deleted, as illustrated in FIG. 10.

FIG. 11 shows a table of the DELETE_OBJECT cmdStatus values in accordance with one embodiment the present invention.

Figure 12:
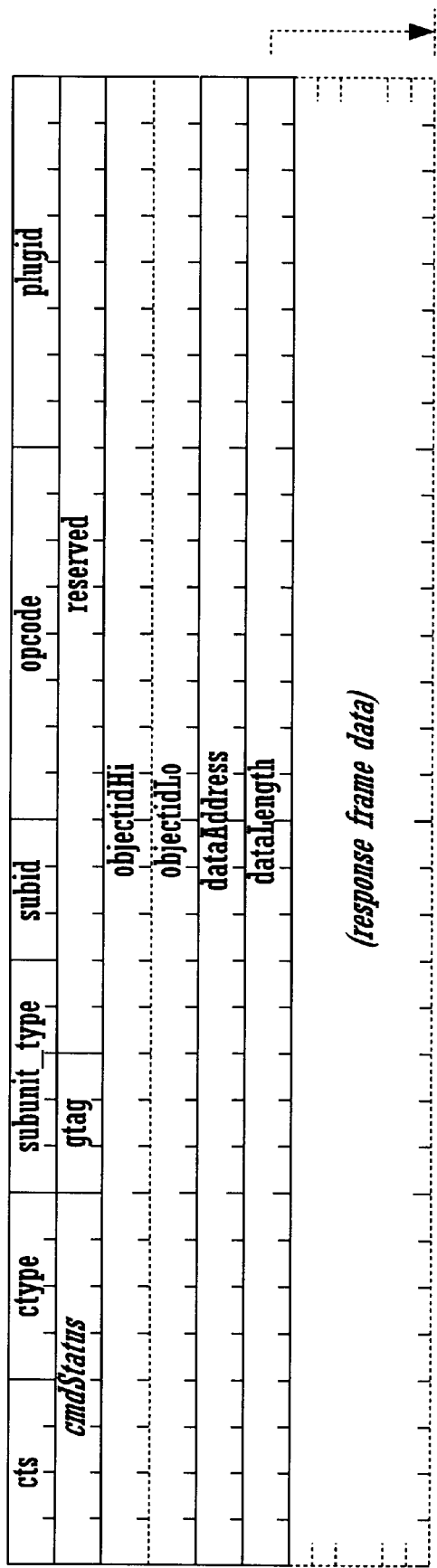
FIG. 12 shows the format of a READ_DESCRIPTOR command in accordance with one embodiment of the present invention.

FIG. 12 shows the format of a READ_DESCRIPTOR command and FIG. 13 shows a table of the READ_DESCRIPTOR command status values in accordance with one embodiment the present invention. The read descriptor command reads selected data from specified locations within the selected data object. The command provides object ID, offset location, and transfer size parameters, as shown in FIG. 12. Referring to FIG. 13, if an ACCEPTED response frame is returned by the target, after processing a READ_DESCRIPTOR control command, the response data consists of additional quadlets, inserted after the address field, that contain the requested data bytes (and zero padding, if necessary). The dataLength field in the response represents the number of quadlets that are returned, which may sometimes be less (but not more) than the number that were requested.

Figure 14:
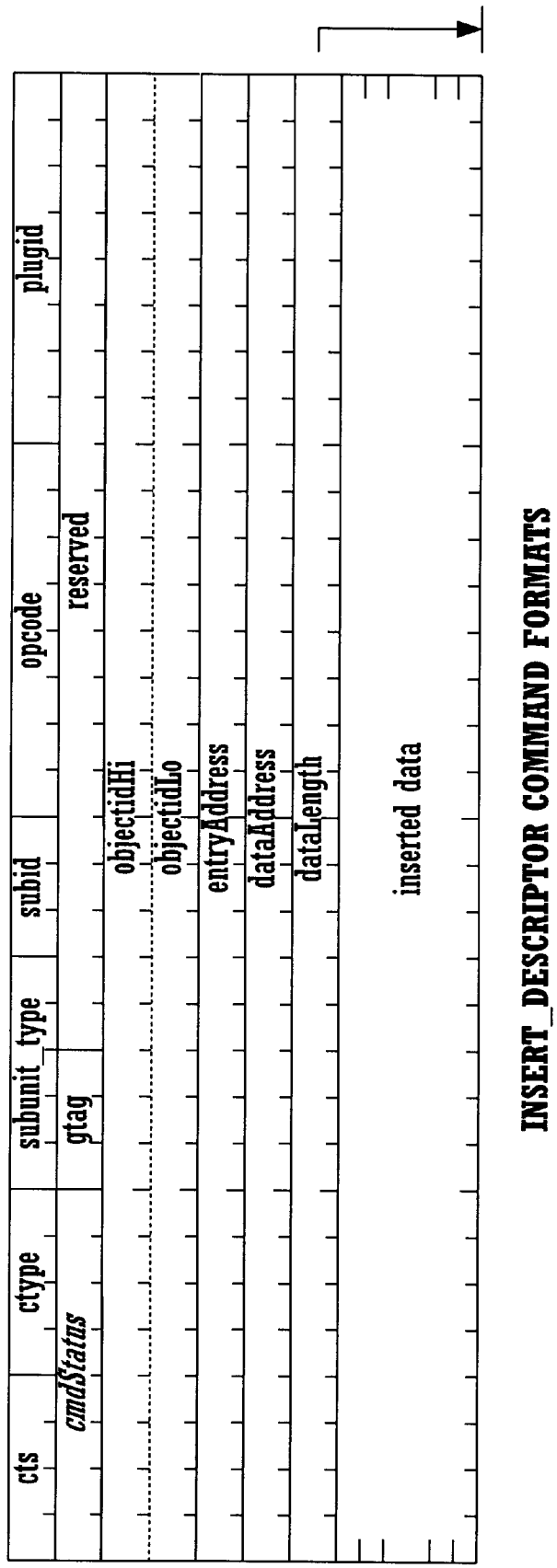
FIG. 14 shows the format of an INSERT_DESCRIPTOR command in accordance with one embodiment the present invention.

FIG. 14 shows the format of an INSERT_DESCRIPTOR command and FIG. 15 shows a table of the INSERT_DESCRIPTOR status values in accordance with one embodiment of present invention. The INSERT_DESCRIPTOR commands insert selected quadlets into the specified descriptor, based on the command frame parameters illustrated in FIG. 14. The 32-bit entryAddress value specifies the address of the entry into which the data is to be inserted; the 32-bit dataAddress value specifies the address after which the data is to be inserted. Both are expressed as offsets from the beginning of the selected object's descriptive data. The largest FFFFFFFF$_{16}$ value is used to specify the last location within the selected entry; other after-the-descriptor addresses are illegal and shall cause a REJECTED status to be returned. The 32-bit dataLength value specifies the number of bytes to be inserted into the selected object. If dataLength exceeds the supported transfer size of the target, the target may REJECT the command or may accept the command and transfer only an initial portion of the data. Referring to FIG. 15, if an ACCEPTED.PARTIAL status is returned, the target shall also update the dataLength field to indicate how many quadlets were actually written. The controller is then expected to issue more WRITE_DESCRIPTOR commands to complete the desired transfer.

FIG. 16 shows the format of a DELETE_DESCRIPTOR command and FIG. 17 shows a table of the DELETE_DESCRIPTOR status values in accordance with one embodiment of the present invention. The DELETE_DESCRIPTOR command deletes the specified descriptor, based on the parameters illustrated in FIG. 16. The 32-bit dataLength value specifies the number of quadlets to be deleted from the selected object. The largest FFFFFFFF$_{16}$ value is used to specify the last location in the descriptive data; other after-the-descriptor addresses are illegal and shall cause a REJECTED status to be returned.

Figure 18:
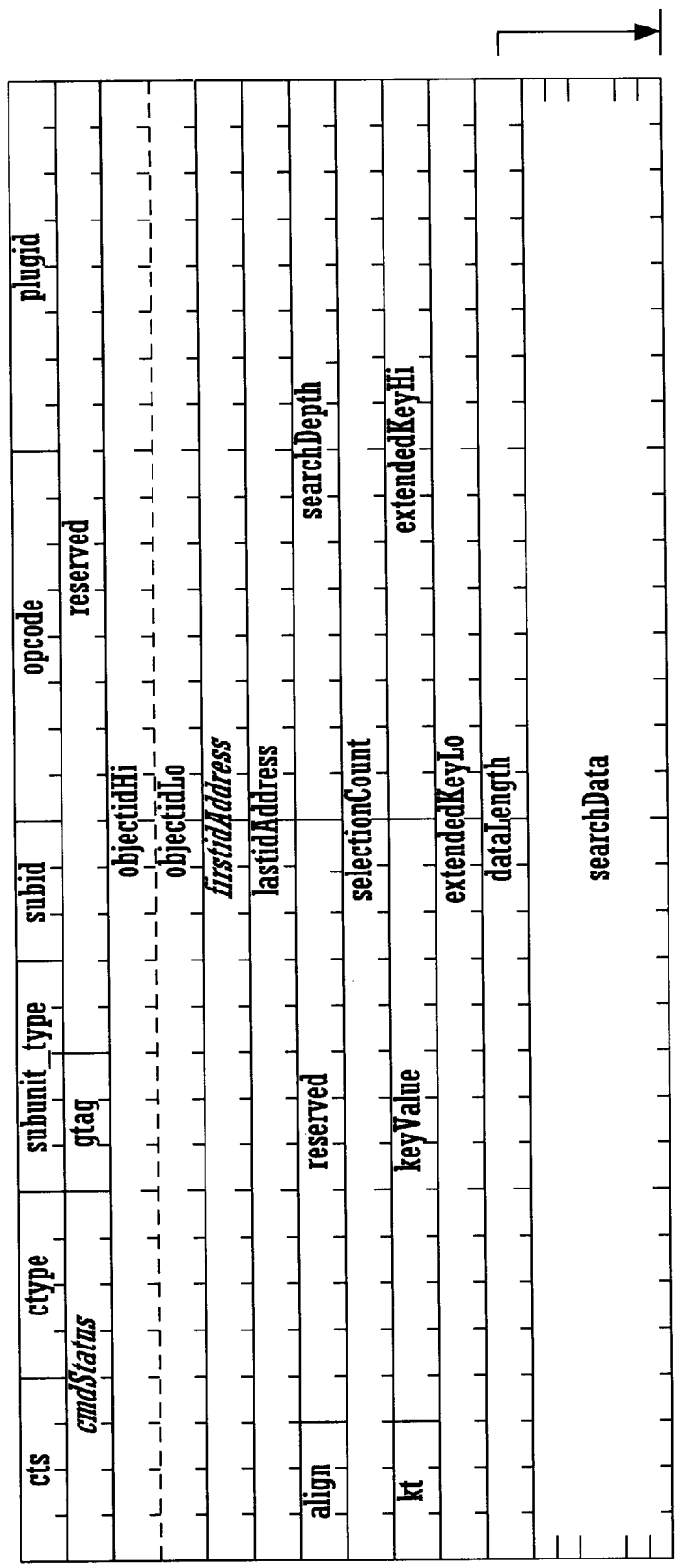
FIG. 18 shows the format of a SEARCH_DESCRIPTOR command in accordance with one embodiment of the present invention.

FIG. 18 shows the format of a SEARCH_DESCRIPTOR command and FIG. 19 shows a table of the SEARCH_DESCRIPTOR to response frame values in accordance with one embodiment of the present invention. FIG. 20 shows a table of the SEARCH_DESCRIPTOR status values in accordance with one embodiment of the present invention.

The search descriptor command functionality can be invoked by sequence of AV/C commands invoked by a controller. Thus, this functionality is optional and not expected to be supported by all subunits. The search descriptor command searches through the object hierarchy for matching descriptive data values, based on the parameters shown in FIG. 18. The 32-bit firstIDAddress value specifies the first object to be searched, expressed as in offset from the beginning of the selected object's descriptive data. The 32-bit lastIDAddress value specifies the last object to be searched, expressed as in offset from the beginning of the selected object's descriptive data. The 32-bit selection Count value specifies which of the matching objects shall be reported; where 0 corresponds to the first object match. The largest FFFFFFF$_{16}$ value is used to specify the last of the matching objects. The 32-bit searchKeyHi and 16-bit searchKeyLo values are concatenated to form a 48-bit searchKey value, that specifies which entry type is to be searched.

Referring still to FIG. 18, the 2-bit align field specifies the search alignment constraints, where matching data entries are searched with 8-bit, 16-bit, 32-bit, and 64-bit alignment constraints, for searchDepth values of 0, 1, 2, and 3 respectively. The 12-bit searchDepth field specifies the search depth constraints, in depths below the reference containing list. The largest searchDepth value indicates there is depth limitation to the search. The 32-bit datalength value specifies the number of bytes in the following searchData fields, upon which the search shall be performed.

The SEARCH_DESCRIPTOR command allows a controller to request the subunit execute a search within the descriptor data space (not within the track data), looking for a specified data-string match. If a search is successful, the returned result specifies the location which was found; multiple specifiers are not returned by the search operation. The controller is expected to specify additional searches (with successively larger sequenceID values) to find other instances that match the search criteria.

The range of the search is determined by several factors, as follows:

1) Starting searches. Multiple subsearches are performed, based on a range of (firstoffset-to-lastoffset) objectID references in the selected objectID-specified object.

2) Type selection. Selected object entry types are searched, based on the key-type matching fields.

3) Search depth. The depths of searches is constrained, based on the searchDepth parameter Referring now to FIG. 21, a flow chart of the steps of a process 2100 in accordance with one embodiment of the present invention is shown. Process 2100 shows the steps of an indivisible operation as performed by a controller device (e.g., set top box 125 of FIG. 2) and a target device (e.g., shared AV/C disk drive 123) coupled via a network bus (e.g., serial bus 130). Particularly, process 2100 shows the steps involved in ensuring indivisible execution of command sequences in the presence of interruptions.

Process 2100 begins in step 2101, where a command sequence is generated by a controller device for a shared target device. As described above, in accordance with AV/C protocols, operations are comprised of sequences of individual AV/C commands (e.g., command sequence 301 of FIG. 3). The commands are identified via their respective group tag fields (e.g., the format of which is shown in FIG. 5). The commands are generated in the controller device in accordance with, for example, a particular instruction received from a user (e.g., change the name of a certain pre-recorded video stream). In step 2102, the command sequence is transmitted to the target for processing via the serial bus.

Figure 21:
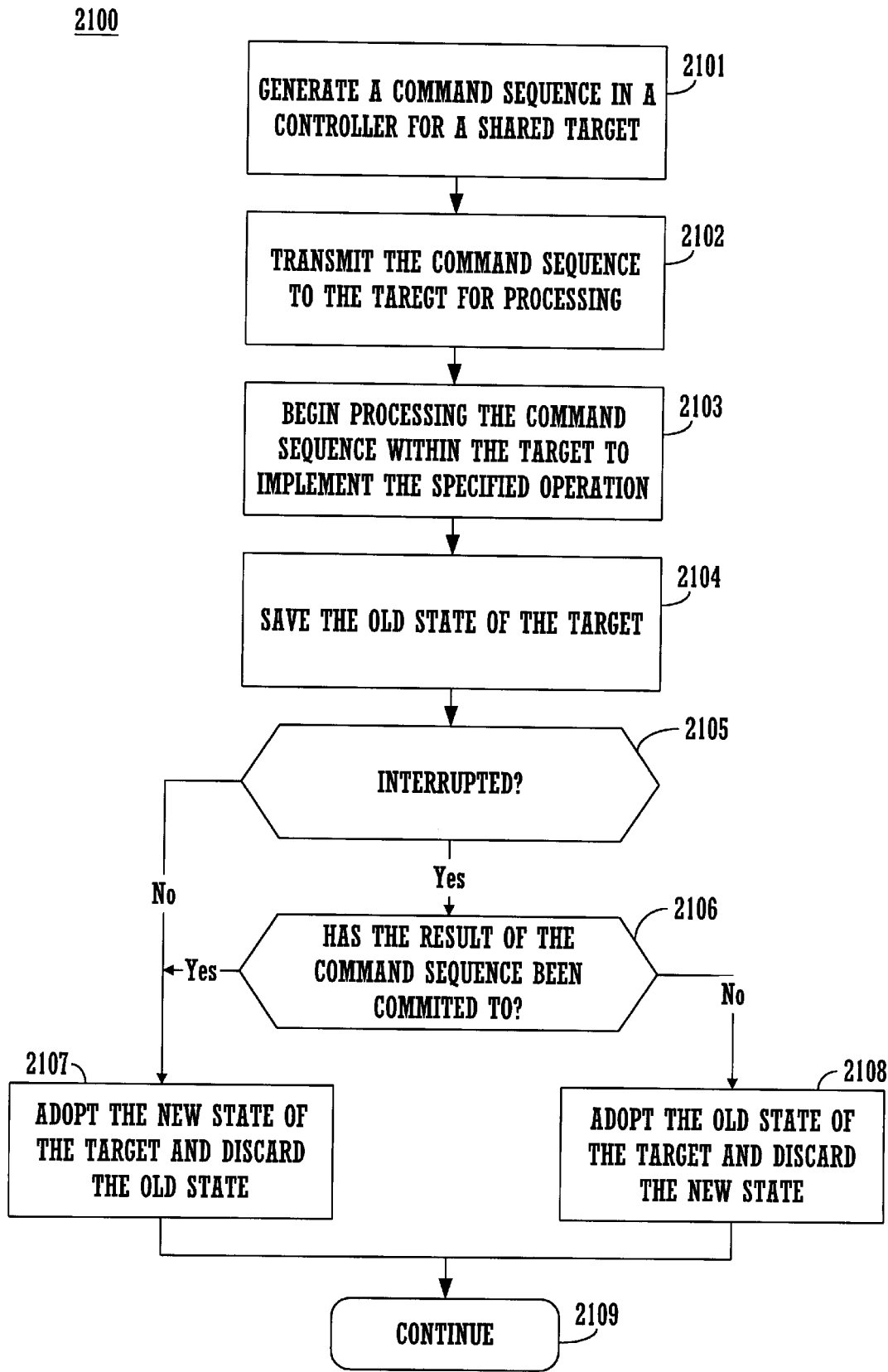
FIG. 21 shows a flow chart of the steps of an indivisible execution process in accordance with one embodiment of the present invention.

Referring still to FIG. 21, in step 2103, the target device begins processing the individual commands of the command sequence, thereby incrementally implementing the specified operation (e.g., renaming the particular video stream descriptor). As described above, the commands of the command sequence have a command status field which indicates the status of the particular command. The command status field allows the target device to determine and track whether individual commands of the command sequence execute as expected, thereby allowing the creation of a command completion record (e.g., as shown in FIG. 6). However, as described above, in step 2104, the target device saves its old state in case the command sequence does not complete successfully. In step 2105, using the group tag field and the command completion record, the target is able to determine whether the command sequence from a particular controller is interrupted. If no interruption occurs, process 2100 proceeds to step 2107, where the new state resulting from the processing of the command sequence is adopted by the target and the old state is discarded.

If an interruption occurs, process 2100 proceeds to step 2106 where the target device determines whether the processing of the command sequence has progressed to the point such that the results of the command sequence can be safely committed to. As described above, at some point in the command sequence, the target can commit to the new state of the command sequence without risking the adverse effects of the interruption (e.g., corrupted data, etc.). In typical implementations, once processing has progressed pass this "commit" point, the new state is adopted. Thus, in step 2106, if processing has not passed this commit point, process 2100 proceeds to step 2107 where new state is adopted and the old state is discarded. If the commit point has not been passed, process 2100 proceeds to step 2108 where the new state is discarded (e.g., all incremental changes being "rolled back") and the saved, old state is adopted. Thus, the target device presents only a new state or an old state to the other external devices on the serial bus. Process 2100 subsequently continues, as shown by step 2109, with any new commands generated by controllers being likewise processed by the target.

Thus, the present invention provides a method and system that leverages the widespread emergence of networking and interface technology (e.g., IEEE 1394 serial communication bus and the wide spread adoption of digital systems) to provide for reliable, efficient access to shared resources within an AV/C based home audio video network. The present invention provides a coherent, extensible architecture for the efficient management of access to shared resources by providing extensions to the AV/C protocol frame work. The extensions of the present invention create an AV/C based system that ensures reliable access to shared resources by multiple devices coupled within the network. Further, the system of the present invention defines logical models and command sets for accessing and updating content stored on shared network devices in a manner consistent with the open standards of IEEE 1394 and other types of serial bus technology.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A system for implementing indivisible command execution in an AV/C home audio video network of connected network devices, the system comprising:
   a network bus operable for conveying commands among a plurality of coupled devices, the network bus implemented within an AV/C home audio video network;
   a controller device coupled to the network bus operable for generating a command sequence, the command sequence including a plurality of AV/C commands;
   a target device coupled to the network bus, the target device operable for implementing AV/C operations by receiving and executing the command sequence; and
   the target device configured to identify the command sequence received from the controller via the network bus by reading a group tag field and a command status included in each AV/C command in order to detect an interruption of the command sequence, such that the target device can avoid a partial execution of the command sequence by ensuring the entire command sequence either completes entirely or fails entirely.

2. The system of claim 1 wherein the controller device includes a computer system for generating the command sequence.

3. The system of claim 1 wherein the target device includes a hard disk drive for storing audio video information.

4. The system of claim 1 wherein the group tag field is configured to identify the position of the AVIC commands within the command sequence to enable the target device to track to determine boundaries of the command sequence with respect to an interrupting command sequence.

5. The system of claim 4 wherein the group tag field is configured to label at least the first, middle, and last AV/C command in the command sequence.

6. The system of claim 1 wherein the command status field is configured to whether one of the AV/C commands within the command sequence has been aborted or rejected.

7. The system of claim 1 wherein the target device is configured to store an old state representative of the condition of the target device prior to commencing execution of the command sequence such that if the command sequence fails, the target device adopts the old state such that the command sequence fails entirely.

8. The system of claim 7 wherein the old state is discarded and the target device adopts the result of the command sequence as a new state if the command sequence is successfully executed.

9. The system of claim 8 wherein the target device is configured to ensure only the old state or the new state is presented to external devices via the network bus.

10. The system of claim 1 wherein the network bus is an IEEE 1394 bus.

11. A system for implementing indivisible command execution in an AV/C home audio video network of connected network devices without requiring the use of locking mechanisms, the system comprising:
    a IEEE 1394 network bus operable for conveying commands among a plurality of coupled devices, the IEEE 1394 bus implemented within an AV/C home audio video network;
    a controller device coupled to the 1394 bus operable for generating a command sequence, the command sequence including a plurality of AV/C commands, the controller device including an embedded computer system for generating the command sequence;
    a target device coupled to the 1394 bus, the target device operable for implementing AV/C operations by receiving and executing the command sequence, the target device including a hard disk drive for storing audio video information; and
    the target device configured to identify the command sequence received from the controller via the 1394 bus by reading a group tag field and a command status included in each AV/C command in order to detect an interruption of the command sequence, such that the target device can avoid a partial execution of the command sequence by ensuring the entire command sequence either completes entirely or fails entirely.

12. The system of claim 11 wherein the group tag field is configured to identify the position of the AV/C commands within the command sequence to enable the target device to track to determine boundaries of the command sequence with respect to an interrupting command sequence.

13. The system of claim 12 wherein the group tag field is configured to label at least the first, middle, and last AV/C command in the command sequence.

14. The system of claim 11 wherein the command status field is configured to whether one of the AV/C commands within the command sequence has been aborted or rejected.

15. The system of claim 11 wherein the target device is configured to store an old state representative of the condition of the target device prior to commencing execution of the command sequence such that if the command sequence fails, the target device adopts the old state such that the command sequence fails entirely.

16. The system of claim 15 wherein the old state is discarded and the target device adopts the result of the command sequence as a new state if the command sequence is successfully executed.

17. The system of claim 16 wherein the target device is configured to ensure only the old state or the new state is presented to external devices via the 1394 bus.

18. A method for implementing indivisible command execution in an AV/C home audio video network of connected network devices, the method comprising the steps of:

a) conveying commands among a plurality of coupled devices using a network bus, the network bus implemented within an AV/C home audio video network;

b) generating a command sequence using a controller device coupled to the network bus, the command sequence including a plurality of AV/C commands;

c) receiving and executing the command sequence by using a target device coupled to the network bus, the target device operable for implementing AV/C operations by executing the command sequence; and d) identifying the command sequence received from the controller via the network bus and detecting an interruption of the command sequence by reading a group tag field and a command status included in each AV/C command, the reading performed by the target device, such that the target device can avoid a partial execution of the command sequence by ensuring the entire command sequence either completes entirely or fails entirely.

19. The system of claim 18 wherein the group tag field is configured to identify the position of the AV/C commands within the command sequence to enable the target device to track to determine boundaries of the command sequence with respect to an interrupting command sequence.

20. The system of claim 19 wherein the target device is configured to ensure only an old state or a new state is presented to external devices via the network bus by preventing the display of the results of a partially executed command sequence to the external devices.

\* \* \* \* \*